United States Patent
Ohta et al.

[11] Patent Number: 6,098,894
[45] Date of Patent: Aug. 8, 2000

[54] APPARATUS FOR SUPPLYING FUEL TO VEHICULAR COMBUSTION HEATER

[75] Inventors: Masao Ohta, Aichi-ken; Makoto Kobayashi, Tochigi-ken; Masashi Tsuneishi, Tochigi-ken; Mamoru Funabashi, Tochigi-ken; Akio Matsuoka, Aichi-ken, all of Japan

[73] Assignees: Honda Giken Kogyo Kabushiki Kaisha, Tokyo; Denso Corporation, Kariya, both of Japan

[21] Appl. No.: 09/045,108

[22] Filed: Mar. 20, 1998

[30] Foreign Application Priority Data

Mar. 24, 1997 [JP] Japan .................................. 9-069770

[51] Int. Cl.$^7$ .................................................. B60H 1/02
[52] U.S. Cl. ...................................... 237/12.3 C; 123/495
[58] Field of Search ....................... 237/12.3 C; 123/495, 123/506

[56] References Cited

U.S. PATENT DOCUMENTS

| | | | |
|---|---|---|---|
| 4,883,226 | 11/1989 | Tomita et al. | 237/12.3 C |
| 5,054,508 | 10/1991 | Benjey | 137/43 |
| 5,277,168 | 1/1994 | Kondo et al. | 123/519 |
| 5,366,151 | 11/1994 | King et al. | 237/2 A |
| 5,617,995 | 4/1997 | Yasuda et al. | 237/12.3 C |
| 5,722,588 | 3/1998 | Inoue et al. | 237/12.3 C |

*Primary Examiner*—Henry Bennett
*Assistant Examiner*—Derek S. Boles
*Attorney, Agent, or Firm*—Armstrong, Westerman, Hattori, McLeland & Naughton

[57] ABSTRACT

In an apparatus for supplying a fuel to a vehicular combustion heater which supplies the fuel from a fuel tank via a fuel pump to the heater which is mounted on an electric vehicle, discharging into atmosphere of fuel vapor from the fuel tank is restricted to the best extent possible. For that purpose, prevention is made of that discharging from the combustion heater of the fuel vapor which is likely to occur when the set pressure for opening a positive pressure valve in a two-way valve for the fuel tank is set high. Interposed in series between the fuel pump and the combustion heater is a one-way valve which opens when the internal pressure in the fuel supply passage has risen to a predetermined set pressure which is higher than the set pressure for opening the positive pressure valve, and a solenoid valve which is opened when the combustion heater is in operation. The solenoid valve is arranged such that the leak pressure to cause the fuel to leak through the solenoid valve at the time when the solenoid valve is kept closed is higher than the set pressure for opening the one-way valve.

1 Claim, 2 Drawing Sheets and# APPARATUS FOR SUPPLYING FUEL TO VEHICULAR COMBUSTION HEATER

BACKGROUND OF THE INVENTION

1. Field of the Invention

The present invention relates to an apparatus for supplying a fuel to a combustion type of vehicular heater (hereinafter called a vehicular combustion heater). The apparatus is mounted mainly on an electric vehicle for the purpose of heating the cabin of the vehicle.

2. Description of the Related Art

A vehicular combustion heater which is mounted on a vehicle is supplied with a fuel from a fuel tank via a fuel pump. In order to protect the fuel tank, there is interposed a two-way valve in a vent passage which is connected to the fuel tank and which is also open to the atmosphere. This two-way valve has a positive pressure valve which opens when an internal pressure in the fuel tank has reached a positive pressure above a predetermined value, and a negative pressure valve which opens when the internal pressure in the fuel tank has reached a negative pressure exceeding (i.e., lower than) a predetermined value.

The electric vehicle has an object of preventing the atmosphere from being polluted. Therefore, in order to minimize the discharging of the fuel vapor from the fuel tank into the atmosphere to the best extent possible, it is required to set a set pressure of opening the above-described positive pressure valve at a high value.

However, if the set pressure to open the positive pressure valve is made high, the fuel is pushed by the internal pressure of the fuel tank when the vehicular combustion heater is not in use. Consequently, the fuel leaks out of the fuel pump into the vehicular combustion heater. The fuel vapor is then discharged into the atmosphere from the vehicular combustion heater. More particularly, when the vehicle is inclined on a slope or the like whereby a rollover valve in a vent passage which is provided in the fuel tank and which is open to the atmosphere is blocked, the fuel is likely to flow into the vehicular combustion heater due to a syphon effect. As a result, the amount of discharge of the fuel vapor into the atmosphere increases.

In view of the above points, the present invention has an object of providing an apparatus for supplying a fuel to a vehicular combustion heater in which the discharging of the fuel vapor from the vehicular combustion heater into the atmosphere is minimized to the best extent possible.

SUMMARY OF THE INVENTION

In order to attain the above and other objects, the present invention is an apparatus for supplying a fuel to a vehicular combustion heater which supplies the fuel from a fuel tank via a fuel pump to the heater which is mounted on a vehicle. The apparatus includes a two-way valve which comprises: a positive pressure valve which opens when an internal pressure of the fuel tank becomes a positive pressure above a predetermined value; and a negative pressure valve which opens when the internal pressure of the fuel tank becomes a negative pressure exceeding a predetermined value. The positive pressure valve and the negative pressure valve are interposed in a passage which is connected to the fuel tank and which opens to the atmosphere. In a fuel supply passage between the fuel pump and the vehicular combustion heater, there are disposed in series: a one-way valve which opens when the internal pressure in the fuel supply passage rises to a predetermined set pressure which is higher than the set pressure for opening the positive pressure valve; and a solenoid valve which is opened when the vehicular combustion heater is in operation. The solenoid valve is arranged such that a leak pressure, which causes the fuel to leak when the solenoid valve is kept closed, is higher than the set pressure for opening the one-way valve.

According to the present invention, since the solenoid valve is closed when the vehicular combustion heater is not in use, the fuel will not flow into the vehicular combustion heater even if the internal pressure of the fuel tank rises to the set pressure for opening the positive pressure valve. Moreover, even if the internal pressure of the fuel supply passage exceeds the set pressure for opening the positive pressure valve due to a syphon effect by the inclination of the vehicle. Further, even if the solenoid valve is locked to the open condition by the inclusion of a foreign matter into the solenoid valve, the fuel flow to the vehicular combustion heater is blocked by the one-way valve at such an internal pressure in the fuel tank as is in the order of the set pressure for opening the positive pressure valve. This arrangement can therefore operate to secure a fail-safe function.

Therefore, even if the set pressure for opening the positive pressure valve is made high in order to restrict the discharging of the fuel vapor from the fuel tank, little or no discharging of the fuel vapor occurs from the vehicular combustion heater. The present invention can thus effectively contribute in the prevention of the atmosphere from being polluted by the fuel vapor.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
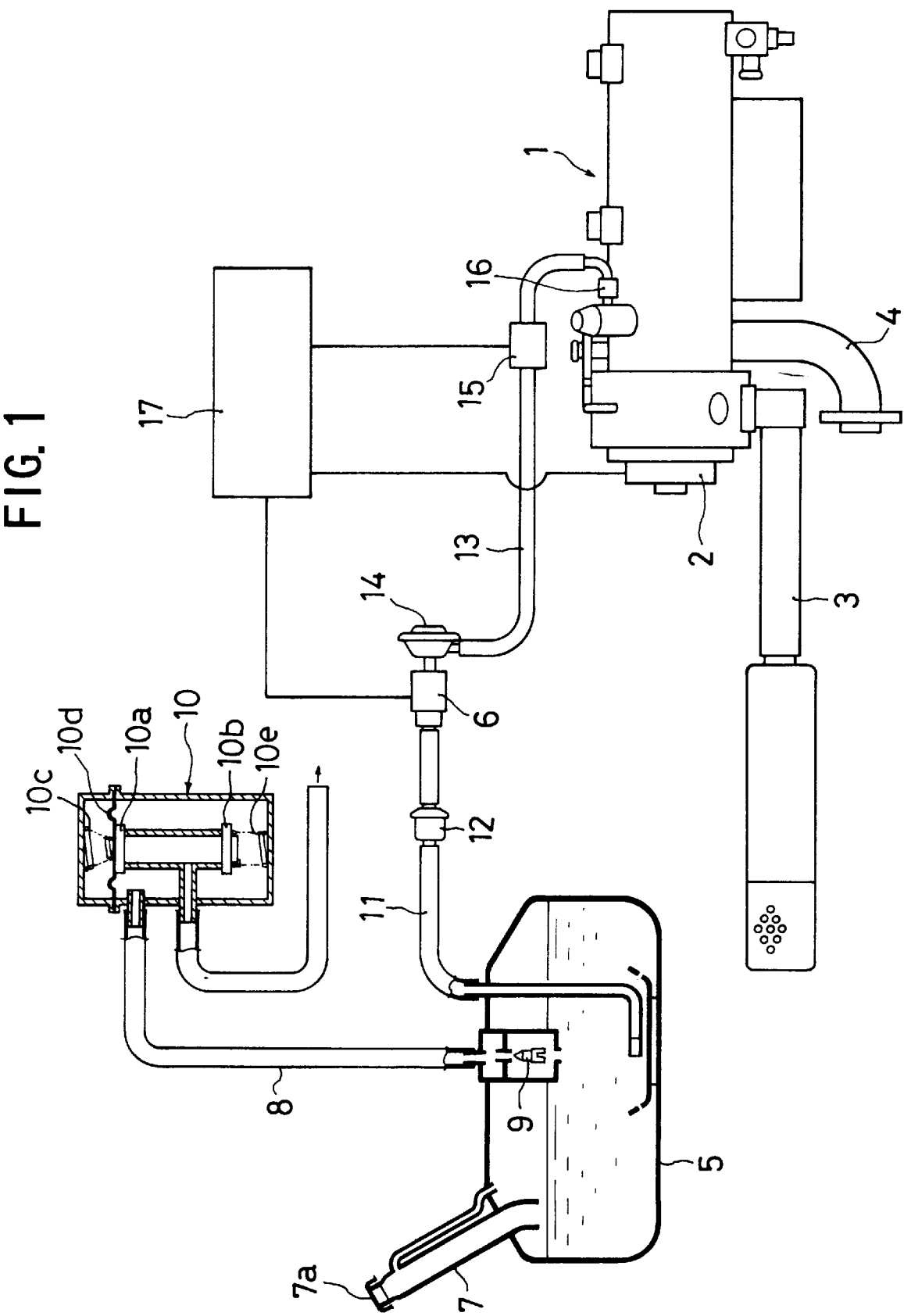
FIG. 1 is a system diagram showing one example of the apparatus of the present invention.

With reference to FIG. 1, reference numeral 1 denotes a vehicular combustion heater which is mounted on an electric vehicle. The air which is sucked from an air intake pipe 3 by an air motor 2 is used as combustion air for combustion of a fuel in a heat exchanger inside the heater 1. After heating the air inside a compartment of the vehicle, the exhaust gas is discharged from an exhaust pipe 4.

The vehicular combustion heater 1 is supplied with the fuel from a fuel tank 5 via a fuel pump 6. To an upper portion of the fuel tank 5, there are connected a fuel supply pipe 7 which is provided at its upper end with a cap 7a, and a vent passage 8 whose downstream end is open to the atmosphere inside a vehicle body frame. There is further provided a rollover valve 9 which prevents the fuel from flowing out of the fuel tank into the vent passage 8 when the vehicle has turned upside down.

Interposed in the vent passage 8 is a two-way valve 10 having therein a positive pressure valve 10a and a negative pressure valve 10b. The positive pressure valve 10a is attached to a diaphragm 10d which is pushed upward by an internal pressure of the fuel tank 5 and which is pushed downward by a spring 10c. When the internal pressure in the fuel tank 5 has reached a positive pressure above a predetermined value which is dependent on the urging (or biasing)

force of the spring 10c, the positive pressure valve 10a opens upward. The negative pressure valve 10b is urged in the upward closing direction by a spring 10e and by the internal pressure of the fuel tank 5. When the internal pressure of the fuel tank 5 has reached a negative pressure exceeding (i.e., lower than) a predetermined value which is dependent on the urging force of the spring 10e, the negative pressure valve 10b opens downward.

In a fuel intake passage 11 between the fuel tank 5 and the fuel pump 6, there is interposed a strainer 12. Further, in a fuel supply passage 13 between the fuel pump 6 and the vehicular combustion heater 1, there are interposed in series, in the order from the upstream side (i.e., from the fuel tank side) downward, a damper 14 which absorbs the pulsations of the fuel, a solenoid valve 15, and a one-way valve 16 which prevents the reverse flow of the fuel from the vehicular combustion heater 1.

The one-way valve 16 is opened when the internal pressure inside the fuel supply passage 13 has exceeded a predetermined value. The set pressure for opening the one-way valve 16 is set to a value which is higher than the set pressure for opening the positive pressure valve 10a. For example, when the set pressure for opening the positive pressure valve 10a is set to a relatively high value such as 140 mmHg in order to restrict the discharge of the fuel vapor from the fuel tank 5 into the atmosphere, the set pressure for opening the one-way valve 16 is set to a value about 180 mmHg. The set pressure for opening the one-way valve 16 cannot be set to too high a pressure in order to prevent the load on the fuel pump 6 from becoming excessive.

Figure 2:
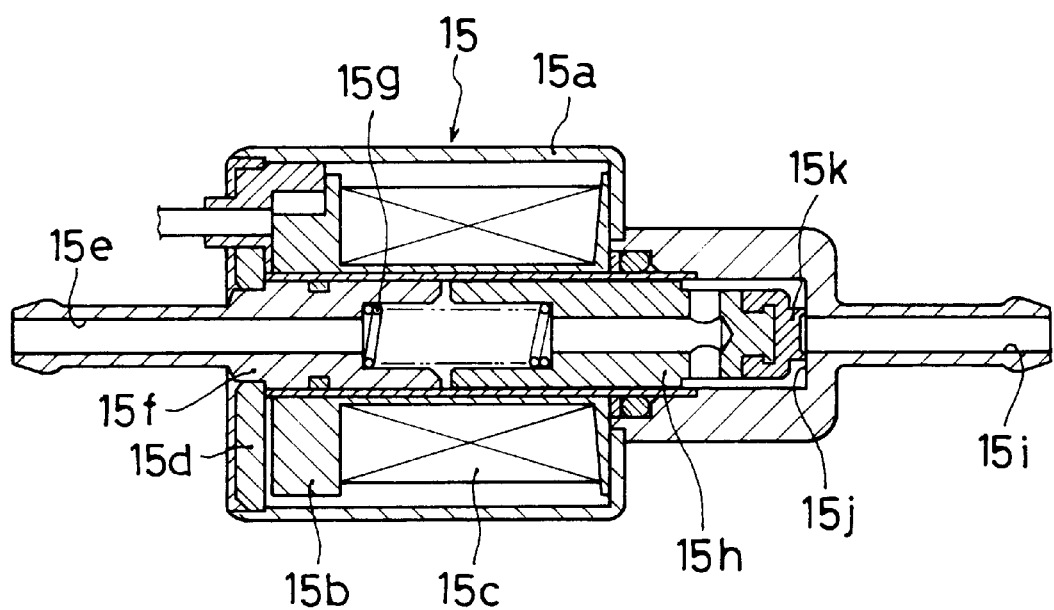
FIG. 2 is a sectional view of a solenoid valve.

The solenoid valve 15 is constituted in the following manner. Namely, as shown in FIG. 2, there are contained inside a casing 15a: a coil 15c which is wound around a bobbin 15b; an end yoke 15d; an inner yoke 15f which is fitted to the end yoke 15d and which has an inlet port 15e; and a plunger 15h which is urged forward (i.e., to the right in FIG. 2) against the inner yoke 15f by means of a spring 15g. At the front end of the plunger 15h there is mounted a valve body 15k which is capable of seating onto a valve seat 15j on a base end of a discharge port 15i which is formed in the casing 15a. When the coil 15c is charged with electricity, the plunger 15h is pulled toward the inner yoke 15f, whereby the valve body 15k is separated from the valve seat 15j, with the result that the solenoid valve 15 is opened. The pressure which causes the fuel to leak through the space between the valve body 15k and the valve seat 15j when the solenoid valve 15 is kept closed, i.e., a leak pressure of the solenoid valve 15 is set to a pressure, e.g., about 500 mmHg, which is higher than the set pressure for opening the one-way valve 16.

The solenoid valve 15 is controlled by a controller 17 in the following manner together with the fuel pump 6 and the air motor 2. Namely, when the vehicular combustion heater 1 is ignited, the air motor 2 is driven and, at the same time, the solenoid vale 15 is charged with electricity to open it. Thereafter, the fuel pump 6 is driven to supply the vehicular combustion heater 1 with the fuel. During the operation of the vehicular combustion heater 1, the solenoid valve 5 is always kept charged with electricity to keep it open.

At the time of extinguishing the vehicular combustion heater 1, the fuel pump 6 is stopped and, after the lapse of a predetermined scavenging time, the air motor 2 is stopped. At the same time, the electric charging to the solenoid valve 15 is stopped in order to close it. This state is maintained while the vehicular combustion heater 1 is not in operation.

As described hereinabove, since the solenoid valve 15 is kept closed while the vehicular combustion heater 1 is not in operation, the fuel will not flow into the vehicular combustion heater 1 even if the internal pressure of the fuel tank 5 has risen to 140 mmHg, which is the set pressure for opening the positive pressure valve 10a if the internal pressure of the fuel supply passage 13 has exceeded 180 mmHg, which is the set pressure for opening the one-way valve 16, due to the syphon effect by the inclination of the vehicle in a slope or the like. The discharging of the fuel vapor from the vehicular combustion heater 1 can thus be surely prevented.

Further, even if the solenoid valve 15 is locked to an open condition by the inclusion of a foreign matter into the solenoid valve 15, the discharging of the fuel to the vehicular combustion heater 1 can be blocked by the one-way valve 16 unless the internal pressure of the fuel supply passage 13 largely increases due to the syphon effect. A fail-safe effect can thus be attained.

It is readily apparent that the above-described apparatus for supplying a fuel to a vehicular combustion heater meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for supplying a fuel to a vehicular combustion heater which supplies the fuel from a fuel tank via a fuel pump to said heater which is mounted on a vehicle, said apparatus including a two-way valve comprising:

a positive pressure valve which opens when an internal pressure of said fuel tank becomes a positive pressure above a predetermined value; and a negative pressure valve which opens when the internal pressure of said fuel tank becomes a negative pressure exceeding a predetermined value, said positive pressure valve and said negative pressure valve being interposed in a vent passage which is connected to said fuel tank and which opens to the atmosphere, wherein, in a fuel supply passage between said fuel pump and said vehicular combustion heater, there are disposed in series: a one-way valve which opens when the internal pressure in said fuel supply passage rises to a predetermined set pressure which is higher than said set pressure for opening said positive pressure valve; and a solenoid valve which is opened when said vehicular combustion heater is in operation, and wherein said solenoid valve is arranged such that a leak pressure to cause the fuel to leak at the time when said solenoid valve is kept closed is higher than said set pressure for opening said one-way valve.

* * * * *